Oct. 31, 1961 — F. A. KROHM — 3,006,788
WINDSHIELD WIPER ARM AND BLADE ASSEMBLY
Original Filed May 7, 1954 — 2 Sheets-Sheet 1
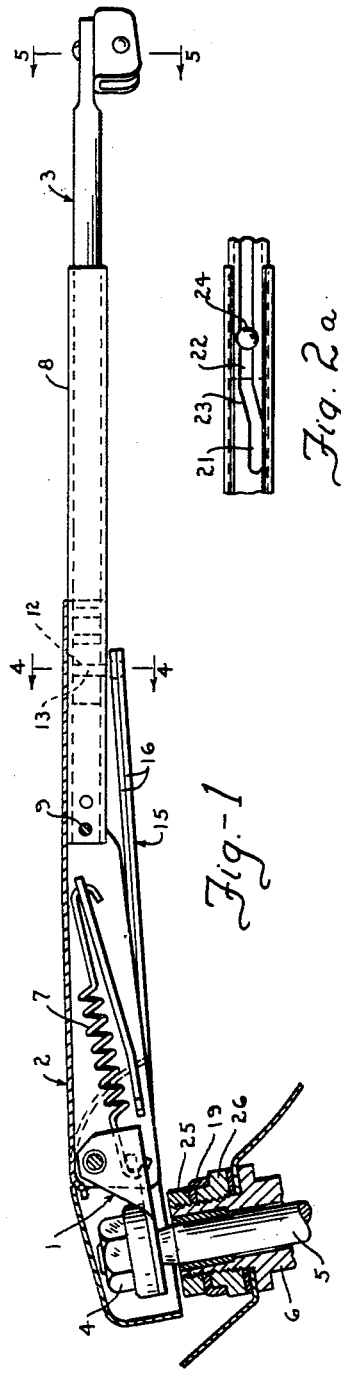
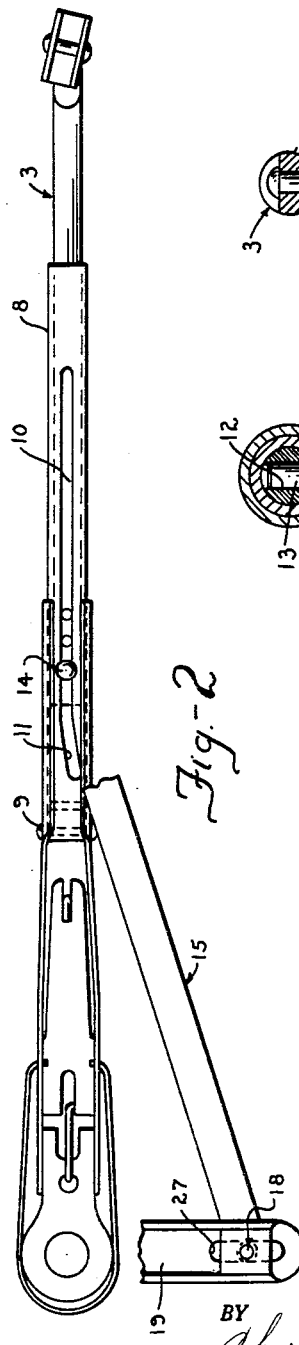
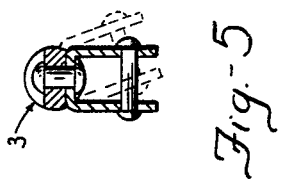
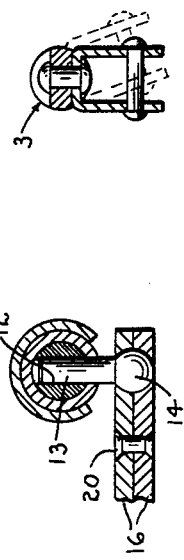
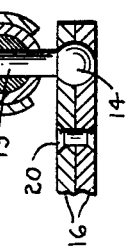
INVENTOR.
FRED A. KROHM
BY Charles S. Penfold
ATTORNEY Oct. 31, 1961   F. A. KROHM   3,006,788
WINDSHIELD WIPER ARM AND BLADE ASSEMBLY
Original Filed May 7, 1954   2 Sheets-Sheet 2
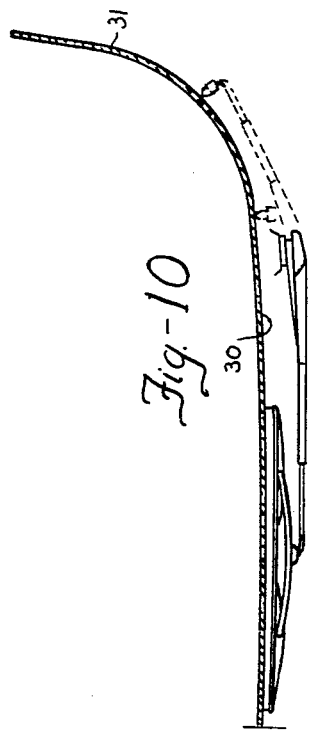
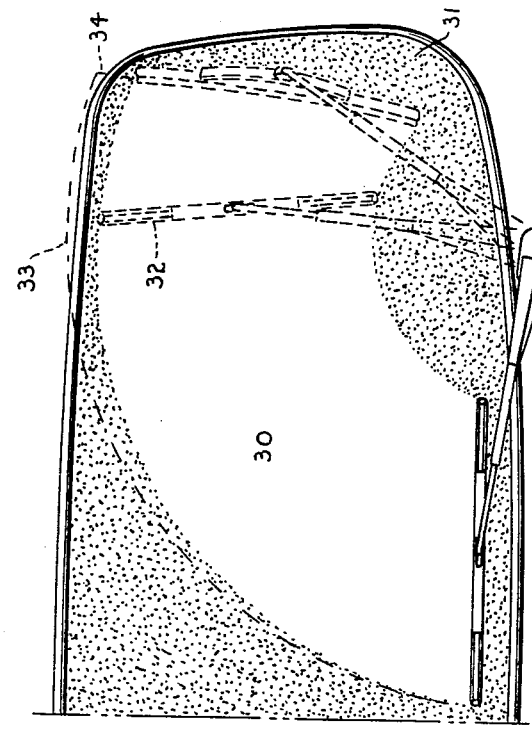
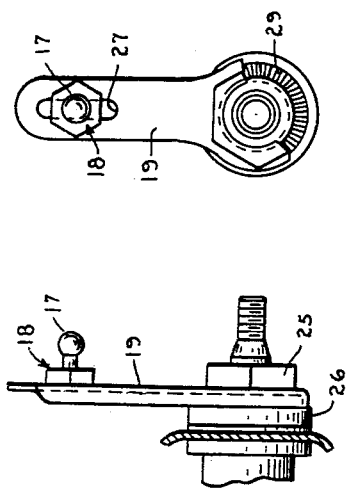
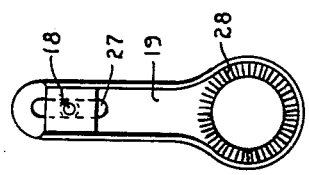
INVENTOR.
FRED A. KROHM
BY Charles S. Penfold
ATTORNEY

United States Patent Office 3,006,788
Patented Oct. 31, 1961

3,006,788
WINDSHIELD WIPER ARM AND
BLADE ASSEMBLY
Fred A. Krohm, Hobart, Ind., assignor to The
Anderson Company, a corporation of Indiana
Original application May 7, 1954, Ser. No. 428,245.
Divided and this application Jan. 24, 1958, Ser. No. 710,926
10 Claims. (Cl. 134—6)

This invention relates generally to windshield wiper devices and more particularly is directed to an improved system of wiping a curved surface.

One of the principal objects of the invention is to provide a unique method utilizing wiper apparatus comprising a wiper blade carrying arm with means for reciprocating and pivoting the blade with respect to the longitudinal axis of the arm so that the blade will be caused to readily conform to a particular portion of the windshield to be wiped.

More specifically, the method is such that the blade during a complete stroke in one direction from a parked position will progressively move toward the drive shaft supporting the wiper arm and as the blade approaches the wing portion of the windshield it will be pivoted so as to reach and wipe a prescribed area which could not be wiped by a blade restricted for movement in a true arc by conventional apparatus. In other words, the invention offers a method whereby the blade will be held erect in conforming relationship to the surface to be cleaned and during its oscillation across the windshield will be caused to pivot only at a predetermined location as the blade also moves toward and away from the drive shaft supporting the wiper arm.

More particularly an object of the invention is to provide a novel method utilizing apparatus comprising, among other things, a primary arm having an inner section for attachment to a drive shaft, an intermediate section pivotally connected to the inner section, guide means on the intermediate section, cam means on the guide means, and extensible arm section slidable and rotatable on the guide means, and a cam follower carried by the inner extremity of the extensible section and cooperable with the cam means; a secondary or movement modifying arm having one end pivoted to the cam follower on the extensible section of the primary arm and its other end arranged for attachment to a mounting so that when the primary arm is oscillated across a windshield by the drive shaft the extensible section and a blade carried thereby will be caused to rotate about the general longitudinal axis of the arm as well as reciprocate lengthwise with respect to the arm. The arrangement is preferably such that the extensible section will be rotated only when the cam means and cam follower are operatively connected.

Additional objects of the invention are to provide wiper apparatus which is durable and positive in operation.

Other objects and advantages of the invention will become apparent after the description hereinafter set forth is considered in connection with the drawings annexed hereto.

In the drawings:

FIGURE 1 is a side view of the primary arm structure with portions in section and shows the mode of connecting the arm to a drive shaft;

FIGURE 2 is a bottom view showing the operative relationship of the primary arm and secondary or movement modifying arm;

FIGURE 2A is a partial view showing a different form of cam means that may be employed;

FIGURE 3 is a partial enlarged sectional view illustrating the manner of operatively connecting the movement modifying arm with a fitting attached to the drive shaft mounting;

FIGURE 4 is an enlarged sectional view taken substantially on line 4—4 of FIGURE 1 and shows the connection between the modifying arm and the cam follower;

FIGURE 5 is a sectional view of a connector carried by the extensible arm section and shows that this section and connector as a unit are rotatable about the longitudinal axis of the primary arm;

FIGURES 6 and 7 are views showing the manner of adjustably connecting the fitting to the drive shaft mounting;

FIGURE 8 is a bottom view of the fitting;

FIGURE 9 is a front view of a windshield showing different positions of the wiper apparatus and wiper blade associated therewith; and FIGURE 10 is a partial longitudinal sectional view taken through a windshield showing different positions of the arm structure and wiper blade.

This application is a division of my application Serial No. 428,245, filed May 7, 1954, which is now abandoned.

Referring more particularly to the drawings, the primary arm above referred to includes, among other things, an inner section 1, an intermediate section 2 pivotally connected to the inner section, and an extensible section 3 mounted for slidable and rotatable movement with respect to the intermediate section.

The inner arm section of the primary arm is preferably provided with means including a nut 4 for detachably securing the arm in any one of a number of predetermined fixed positions on a drive shaft 5, the latter of which is rotatably supported in a mounting 6 which extends through the cowl of a vehicle body.

The intermediate section 2 of the primary arm is preferably of channel shape. An assembly including a helical spring 7 is housed within the channel and one end of the spring is connected to the inner section and its other end to a member which in turn is attached to the intermediate section for urging the intermediate and extensible arm sections as a unit toward a windshield. The intermediate section is further provided with tubular guide means 8 which actually constitutes a continuation of the intermediate or channel section. This guide means may be secured in the intermediate section in any manner desired but is preferably detachably secured in place by a removable rivet or fastener 9 which extends through holes provided therefor in the intermediate section and guide means. The guide means is preferably round in cross-section and rotatably supports the extensible section 3 which is also round in cross-section. The guide means is provided with means preferably in the form of a longitudinal slot 10 having a spiral or helical continuation 11 constituting a cam means. It will be noted that the inner extremity of the guide means as depicted in FIGURES 1 and 2 is provided with a plurality of holes in order that a rivet, such as 9, may be located in either of the holes so that the guide may be adjusted to different positions and thereby afford a control for regulating the location or period it is desired to effect rotation of the extensible arm section 3.

The inner extremity of the extensible arm section is provided with a hole 12 and a pin 13 constituting a cam follower which has its inner end anchored in the hole. The shank of the pin is adapted for movement in the slot and is provided with a spherical head 14 which is connected for universal movement with respect to the outer end of a movement modifying arm generally designated 15. The movement modifying arm is preferably comprised of a pair of corresponding elongated flat members 16. The outer ends of the members are preferably provided with corresponding recesses which cooperate with one another to provide a socket which receives the head 14 of the pin 13. The inner ends of the members are similarly formed to receive a spherical head 17 of a shaft of a bolt assembly 18 attached to an elongate fitting 19. Rivets 20 are preferably employed to secure the members 16 of the movement modifying arm together in superimposed relationship so that the spherical heads of the pin and shaft are locked for universal movement with respect to the modifying arm.

As clearly shown in FIGURE 2 of the drawing, the pin 13 or cam follower when sliding in the longitudinal slot 10 serves to prevent rotation of the extensible arm section 3, but when the pin moves into the continuation 11 it will cause rotation of the extensible arm section.

As exemplified in FIGURE 2A of the drawing, a guide means may be formed so as to provide a pair of parallel longitudinal slots 21 and 22 joined by a helical slot 23 constituting a cam means. A cam follower 24 is disposed for movement in the slots. With this arrangement the follower will cause the extensible arm section to rotate between the periods of its straight longitudinal movement in either of the slots 21 and 22. It is thus evident that the rotational movement of the extensible section can be varied.

As depicted in FIGURES 1 through 4, the fitting 19 is provided with an inner enlarged end which is preferably detachably connected to the drive shaft mounting 6 by and between a pair of nuts 25 and 26 threaded on the mounting. The outer end of the fitting is provided with a slot 27 through which the shaft of the bolt assembly extends so that the modifying arm can be adjustably secured to the fitting for the purpose of varying the travel of the extensible section 3 of the primary arm which carries the wiper blade. The inner enlarged end of the fitting is provided with an aperture through which the threaded portion of the drive shaft mounting extends and is further provided with serrations 28 which cooperate with corresponding serrations 29 preferably provided on the upper end or surface of the nut 26 to firmly secure the fitting in place after adjustment. With this arrangement, the travel of the extensible arm can be varied to suit different installation requirements. The adjustments between the modifying arm and fitting and between the fitting and the shaft mounting all contribute toward control of the extensible arm section. The fact that the complete apparatus is supported on the drive shaft and mounting therefor also facilitates installation.

In view of the foregoing, and referring to FIGURES 9 and 10 of the drawing, the wiper apparatus is shown in a parked position and in different operative positions on a windshield having a frontal portion 30 and a wing portion 31. When the blade is moved upwardly and toward the right the blade will take the path shown by the unshaded area. More specifically in this regard, the extensible section and blade can move only longitudinally as it traverses the frontal portion 30 of the windshield. When the blade reaches or approaches the dotted line position 32 at the beginning of the bent wing portion of the windshield, the movement modifying arm 15 will pull the follower further inwardly and into the slot 11 and thereby effect pivotal or rotational movement of the extensible arm section as shown in FIGURE 5 and maintain the blade in a substantially erect surface conforming position as exemplified in FIGURES 9 and 10 as it travels over the wing of the windshield. The blade will traverse the same path on its return movement. In addition to wiping a windshield at the places described, the blade is prevented from banging against the windshield frame.

The importance of the invention is perhaps best exemplified in FIGURE 10 where the blade if mounted for movement through a true arc in the conventional way would cause the blade to travel the path indicated by the dotted lines 33 and cause at least a portion of the blade to swing off the windshield into space as indicated by the dotted line position 34.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A method of wiping a curved windshield by a wiper blade carried by an arm, which comprises reciprocating the blade along the longitudinal axis of the arm and rotating the blade about said axis to cause the blade to be disposed substantially perpendicular to and in engagement with the windshield as the arm and blade are moved back and forth with respect thereto.

2. A method of wiping a curved portion of a windshield with a wiper blade carried by an elongate arm part, which comprises moving the arm part and blade back and forth relative to the windshield, reciprocating the blade along the axis of the arm part through at least a portion of the wiping of the windshield and providing a similar reciprocation while rotating the arm part and blade about the longitudinal axis of the arm part through a different portion of the wiping of a windshield to cause the blade to readily conform to the curved portion when moved thereon.

3. A method of wiping a windshield with a wiper blade mounted on an extended portion of a wiper arm for longitudinal and rotational movement therewith, which comprises directing the arm so that the blade is moved back and forth on a portion of a windshield, and in transmitting a force or forces to the extended portion of the arm to impart longitudinal and rotational movements to the extended portion of the wiper arm and blade on and about the longitudinal axis of the arm during at least a portion of their movement back and forth relative to the windshield.

4. A method of wiping a curved portion of a windshield with a wiper blade carried by an elongate arm part, which comprises moving the arm part and blade back and forth relative to the windshield, reciprocating the blade along the longitudinal axis of the arm part through at least a portion of the wiping of the windshield, providing a similar reciprocation while rotating the arm part and blade about the longitudinal axis of the arm part through a different portion of the wiping of the windshield and again reciprocating the arm part and blade along the longitudinal axis of the arm part.

5. A method of wiping a curved portion of a windshield with a wiper blade carried by an elongate arm part, which comprises moving the arm part and blade back and forth relative to the windshield, reciprocating the blade and arm part along the longitudinal axis of the arm part throughout the wiping movement of the blade, and rotating said arm part and blade about the longitudinal axis of the arm part through at least a portion of the wiping movement of the blade on the windshield.

6. A method of wiping two differently formed curved areas of a windshield which comprises moving a wiper arm and a resiliently flexible wiper blade thereon in a direction to cause the blade to wipe first one area and then causing the blade to slide along the arm and tilt about its longitudinal axis as it is moved on the other area to continuously maintain the blade in normal wiping surface-conforming relationship therewith.

7. A method of wiping a windshield having a frontal portion and a rearwardly extending portion with a resiliently flexible wiper blade carried by a wiper arm, which comprises simultaneously moving the arm and blade relative to the frontal portion and the blade longitudinally of the arm to cause the blade to wipe the frontal position, continuing movement of the arm and blade relative to the rearwardly extending portion and the blade longitudinally of the arm, and during such continuing movement causing the blade to tilt about its longitudinal axis relative to the arm and thereby maintain the blade in normal wiping surface-conforming relationship with said rearwardly extending portion.

8. A method of wiping a curved windshield having a frontal portion and a wing portion, which comprises moving a wiper arm and a resiliently flexible wiper blade thereon relative to the windshield and the blade outwardly along the arm so the blade will wipe the frontal portion and then causing the blade to move farther along the arm and over the wing portion and tilt about its longitudinal axis to continuously maintain it in normal wiping surface-conforming relationship with said portion.

9. A method of wiping a curved windshield which comprises moving a resiliently flexible wiper blade by a wiper arm over a curved portion of the windshield, sliding the blade along the arm during such movement and tilting the blade about its longitudinal axis with relation to the arm to maintain the blade in normal wiping surface-conforming relationship with the windshield.

10. A method of wiping a curved surface with an assembly comprising a resiliently flexible blade and a linkage device carried by an arm, which comprises oscillating the arm and assembly and forcing the assembly along the arm and toward the surface to cause the blade to travel on and conform thereto, and tilting the assembly about its longitudinal axis to maintain the blade normal to said surface during such travel.

References Cited in the file of this patent

UNITED STATES PATENTS

| | | |
|---|---|---|
| 2,185,572 | Sawyer | Jan. 2, 1940 |
| 2,691,186 | Oishei et al. | Oct. 12, 1954 |
| 2,775,780 | Pisano | Jan. 1, 1957 |

FOREIGN PATENTS

| | | |
|---|---|---|
| 1,047,648 | France | Jan. 22, 1953 |